United States Patent [19]

Shirahama et al.

[11] Patent Number: 4,991,460
[45] Date of Patent: Feb. 12, 1991

[54] SHIFT LEVER DEVICE FOR AUTOMATIC TRANSMISSION

[75] Inventors: Katsunori Shirahama, Zama; Toshiyuki Hara, Kanagawa; Junichi Maekawa, Kanagawa; Hiroshi Yamazaki, Kanagawa; Tsutomu Aihara, Kanagawa, all of Japan

[73] Assignees: Nissan Motor Co., Ltd., Yokohama; Ohi Seisakusho Co., Ltd., Kanagawa, both of Japan

[21] Appl. No.: 263,766

[22] Filed: Oct. 28, 1988

[30] Foreign Application Priority Data

Oct. 30, 1987 [JP] Japan ................................ 62-166344

[51] Int. Cl.⁵ ........................ G05G 1/04; B60K 20/00
[52] U.S. Cl. .................................... 74/523; 74/473 P
[58] Field of Search ................ 74/523, 473 R, 473 P; 180/336, 333

[56] References Cited

U.S. PATENT DOCUMENTS 3,122,941 3/1964 Goldsmith .......................... 74/473 P
4,138,903 2/1979 Burdette et al. .................. 74/473 R
4,619,152 10/1986 Suzuki .......................... 74/473 P X
4,698,048 10/1987 Rundle .......................... 74/473 R X
4,732,232 3/1988 Miyagi et al. ................. 74/473 R X

FOREIGN PATENT DOCUMENTS 61-146641 7/1986 Japan ................................ 74/473 R Primary Examiner—Rodney M. Lindsey
Attorney, Agent, or Firm—Foley & Lardner, Schwartz, Jeffery, Schwaab, Mack, Blumenthal & Evans

[57] ABSTRACT

To reduce the longitudinal dimension of a multirange shift lever device for an automatic transmission, a guide plate is formed with a shift lever guide slot extending in both longitudinal and lateral directions of the vehicle, the shift lever pivotal motion in the longitudinal direction is directly transmitted via a pivotal motion transmitting mechanism (e.g. shaft) linked with the shift lever and that in the lateral direction is converted into the longitudinal direction pivotal motion by a pivotal motion converting mechanism (e.g. cam groove) linked with the shift lever.

5 Claims, 6 Drawing Sheets

SHIFT LEVER DEVICE FOR AUTOMATIC TRANSMISSION

BACKGROUND OF THE INVENTION

1. Field of the Invention

The present invention relates to a shift lever device for controlling an automatic transmission for an automotive vehicle, and more specifically to a shift lever device which can select seven or more transmission range positions.

2. Description of the Prior Art

In general, a shift lever device for an automatic transmission mounted on an automatic vehicle is disposed between an instrument panel and a console box at the central portion of the vehicle floor. The driver can select a desired transmission range position by selectively shifting a shift lever of the device in the frontward or rearward direction The transmission ranges selectable by the shift lever are usually, as shown in FIG. 11, 6 range positions of Park (P), Reverse (R), Neutral (N), automatic Drive (D), Manual II (2), and Manual I (1), for instance as disclosed in Japanese Published Unexamined (Kokai) Utility Model Appli. No. 56-52098.

Further, there exists an automatic transmission of 7 range positions in which an Overdrive (OD) range position is added to the 6 range positions. In this 7 range position shift lever device, the OD range is usually selected by actuating an electrical switch provided on top of the shift lever. Therefore, it follows that the size, weight, and cost of the shift lever knob are inevitably increased and therefore the relatively heavy knob is readily vibrated.

To overcome the above-mentioned problems, it is preferable to allow all the 7 range positions to be selectable by shifting the shift lever mechanically without use of the electrical switch. However, when all the 7 range positions are simply arranged along the vehicle longitudinal direction, the shift stroke (shift distance) of the shift lever inevitably increases, thus resulting in another problem in that a large space is required between the instrument panel and the console box or the parking brake lever. Therefore, it has been necessary to reduce the volume of the console box or the size of the instrument panel. In addition, when the shift lever stroke increases in the vehicle longitudinal (front and rear) direction, there exists another problem in that the driver must bend his body forward whenever he shifts the shift lever to Park position, for instance, over a long shift distance

SUMMARY OF THE INVENTION

With these problems in mind, therefore, it is the primary object of the present invention to provide a shift lever device for controlling an automatic transmission which can reduce the shift lever stroke in the front and rear direction by dividing the shift lever stroke into a first vehicle longitudinal direction and a second vehicle lateral direction.

To achieve the above-mentioned object, a shift lever device for controlling an automatic transmission for an automotive vehicle, according to the present invention, comprises: (a) a shift lever pivoted in first and second directions, for controlling the automatic transmission; (b) a guide plate formed with a shift lever guide slot extending in both first and second directions, for guiding said shift lever at a plurality of transmission range positions; (c) a pivotal motion transmitting mechanism linked with said shift lever, for directly transmitting a first-direction pivotal motion of said shift lever; (d) a pivotal motion converting mechanism linked with said shift lever, for converting a second-direction pivotal motion of said shift lever into the first-direction pivotal motion; and (e) an output lever linked between said pivotal motion transmitting and converting mechanisms and the automatic transmission, for transmitting the transmitted and converted first direction pivotal motion to the automatic transmission to control the transmission.

In the first embodiment, the pivotal motion transmitting mechanism includes (a) a U-shaped bracket fixed to a lower end of said shift lever; (b) a pivotal shaft formed with straight slots extending in an axial direction thereof; and (c) a pin passed through the straight slots, for linking said U-shaped bracket to said shaft; and the pivotal motion converting mechanism includes (d) a collar member formed with cam grooves extending at an inclination angle with respect to an axial direction of said pivotal shaft, said collar member being disposed coaxially with said shaft with said pin passed through both the straight slots and said cam grooves, said output lever being fixed to an end of said collar member.

In the second embodiment, the pivotal motion transmitting mechanism includes (a) a U-shaped bracket fixed to a lower end of said shift lever; (b) a pivotal shaft; and (c) a pin for pivotally connecting said U-shaped bracket to said pivotal shaft; and wherein said pivotal motion converting mechanism includes (d) a cam groove formed in said output lever extending at an inclination angle with respect to an axial direction of said pivotal shaft, said output lever being fixed to said pivotal shaft, said shift lever being passed through said cam groove.

In the shift lever device for controlling an automatic transmission according to the present invention, since the shift range positions are arranged in both vehicle longitudinal and lateral directions and since the shift lever pivotal motion in the longitudinal direction can directly be transmitted through the pivotal motion transmitting mechanism linked with the shift lever, and further the shift lever pivotal motion in the lateral direction can be converted into the same longitudinal direction pivotal motion though the pivotal motion converting mechanism also linked with the shift lever, it is possible to reduce the longitudinal dimension of the multirange shift lever device. Therefore, it is possible to allow a large console box to be disposed and the driver not to bend his body forward whenever he shifts the shift lever.

DETAILED DESCRIPTION OF THE PREFERRED EMBODIMENTS

The feature of the shift lever device according to the present invention is to divide the transmission range positions in the vehicle longitudinal direction and the vehicle lateral direction, and to directly transmit the shift lever pivotal motion in the longitudinal direction through a pivotal motion transmitting mechanism (e.g. shaft) linked with the shift lever, and convert the shift lever pivotal motion in the lateral direction into the longitudinal direction pivotal motion through a pivotal motion converting mechanism (e.g. cam groove) linked with the shift lever.

A first embodiment of the shift lever device for an automatic transmission of the present invention will be described with reference to FIGS. 1 to 7.

Figure 1:
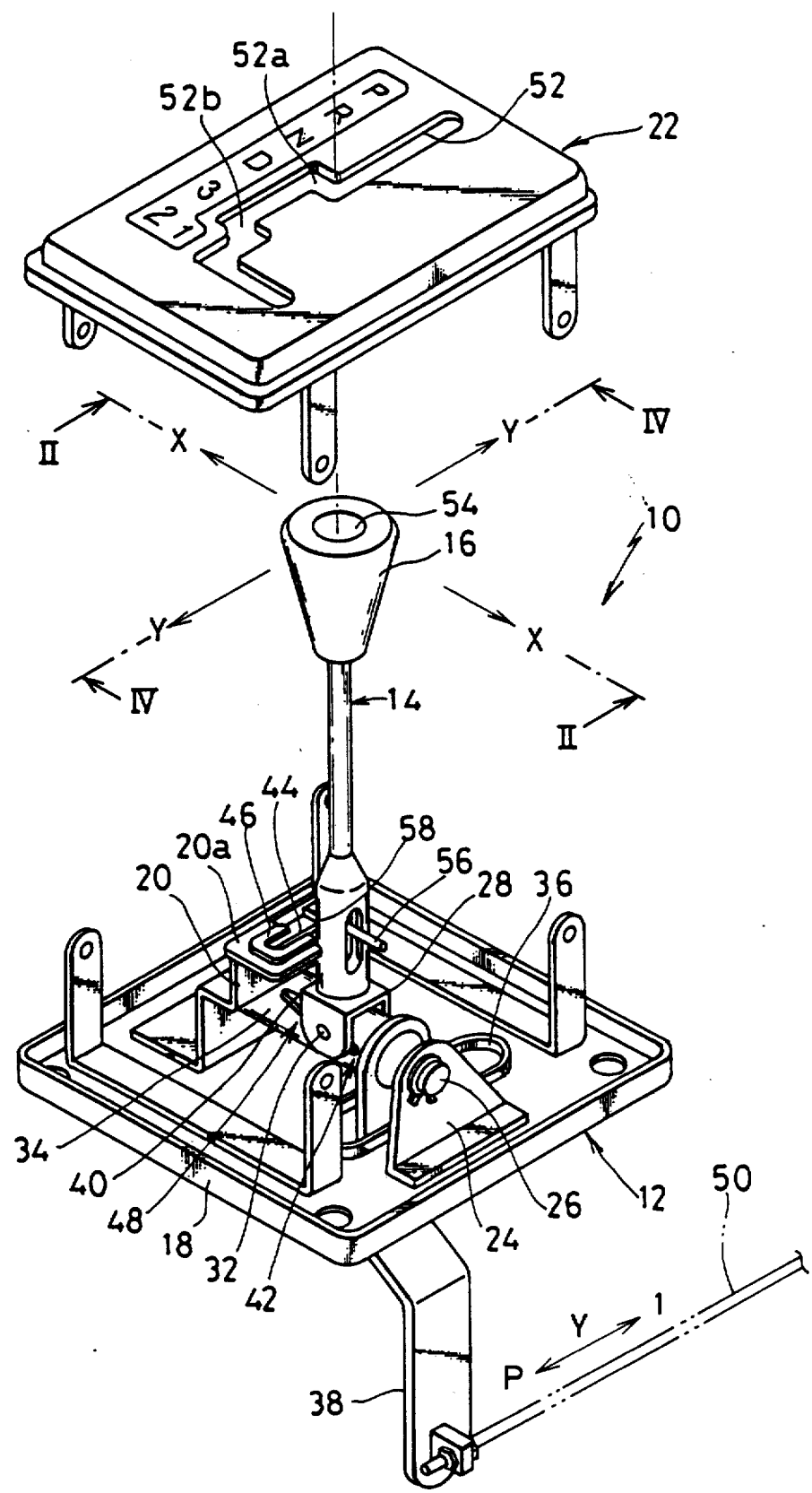
FIG. 1 is a perspective, partially exploded view showing a first embodiment of the shift lever device according to the present invention.

A shift lever device 10 can be roughly divided into a shift mechanism section 12, a shift lever 14 vertically disposed on the shift mechanism section 12, and a shift lever guide cover 22. Therefore, when the shift lever 14 is shifted along a guide slot 52 of the shift lever guide cover 22 by the driver, an output lever 38 is pivoted to move a select rod 50 (connected to a transmission) in the vehicle longitudinal (Y) direction as shown in FIG. 1 to select one of transmission ranges. In this case, when the shift lever 14 is moved in the Y direction about a pivotal shaft 26, a pivotal motion transmitting mechanism 42 (i.e. shaft 26) is directly pivoted together with a collar member 34 to move the select rod 50 via the output lever 38 fixed to the collar 34. However, when the shift lever 14 is moved in the vehicle lateral (X) direction about the bush 46, a pivotal motion converting mechanism 48 (i.e. cam grooves 40 formed in the collar 34) is pivoted to move the select rod 50 in the same way.

In more detail, the shift mechanism section 12 comprises a base plate 18 fixed to a floor panel (not shown); a detent plate 20 vertically fixed to the base plate 18; a bracket 24 fixed to the base plate 18 so as to oppose the detent plate 20; the pivotal motion transmitting and converting mechanisms 42 and 48 pivotally supported between the detent plate 20 and the bracket 24; the output lever 38 fixed to the pivotal motion converting mechanism 48 via an opening 36 formed in the base plate 18; and a select rod (or wire) 50 fixed to the output lever 38. This select rod 50 is linked with a control valve (not shown) incorporated in an automatic transmission to select any desired transmission range.

Figure 3:
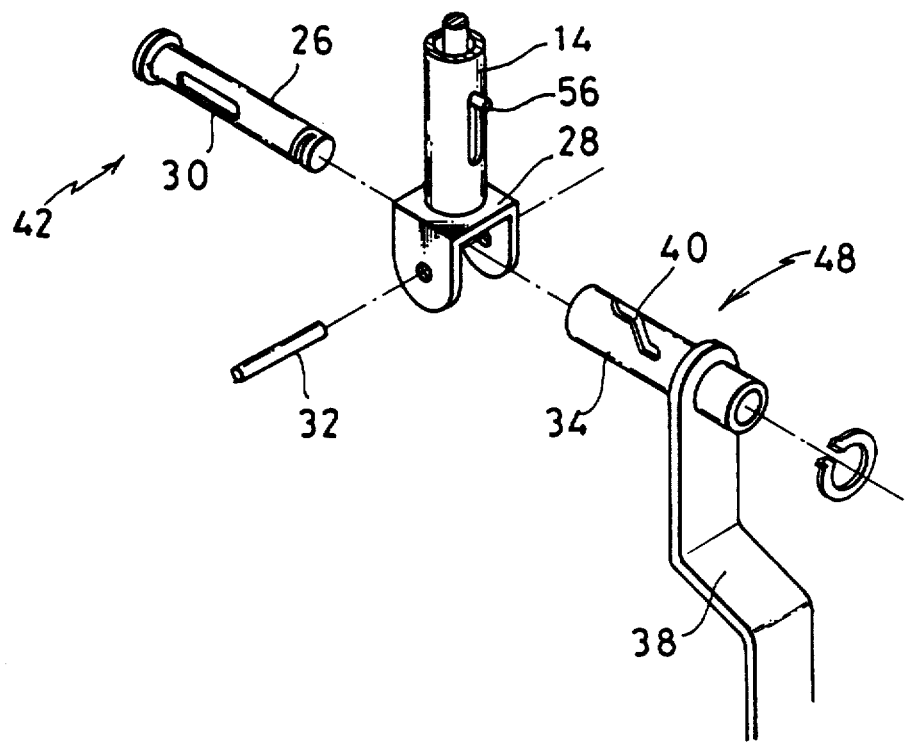
FIG. 3 is an exploded view showing an essential portion (pivotal motion transmitting and converting mechanism) of the shift lever device shown in FIG. 1.
Figure 4:
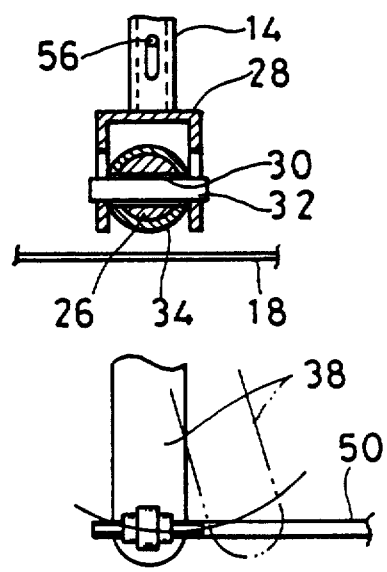
FIG. 4 is a cross-sectional view taken along the line IV—IV in FIG. 1, which also shows the essential portion of the shift lever device.
Figure 5:
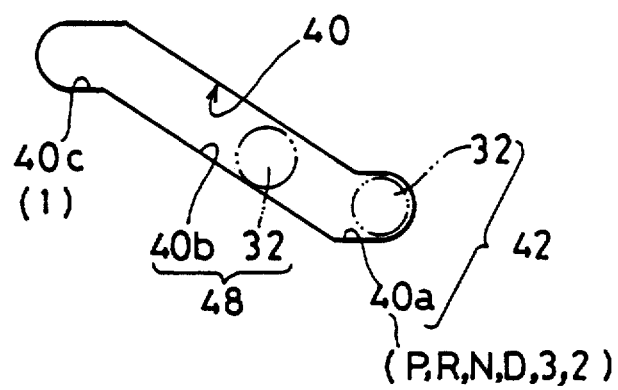
FIG. 5 is an illustration for assistance in explaining the cam groove formed in a collar of the shift lever device.

With reference to FIGS. 3 and 4, the pivotal motion transmitting and converting mechanisms 42 and 48 comprises a pivotal shaft 26 formed with two straight slots 30 extending in the axial direction thereof and penetrating in the radial direction thereof; the collar member 34 formed with cam grooves 40 extending in the axial direction thereof and at an inclination angle with respect to the axial direction thereof and penetrating in the radial direction thereof; a U-shaped bracket 28 fixed to the lowermost end of the shift lever 14; and a pin 32.

Figure 2:
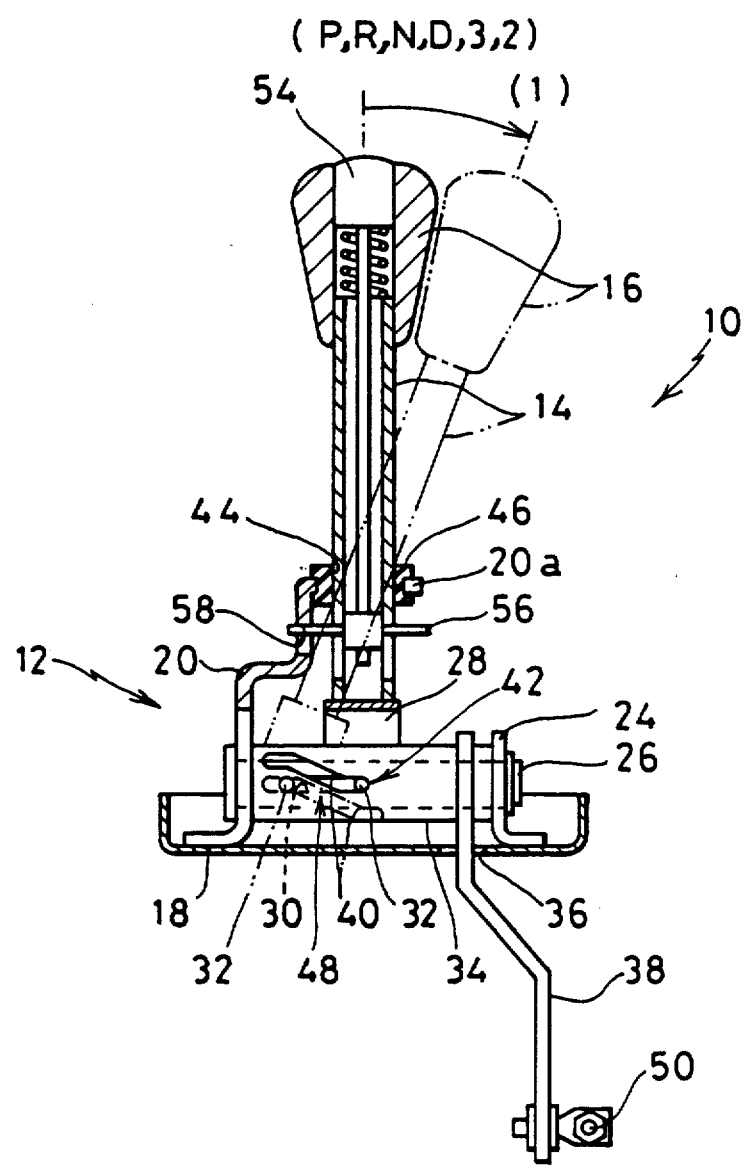
FIG. 2 is a cross-sectional view taken along the line II—II in FIG. 1.

As depicted in FIG. 2, the pivotal shaft 26 is pivotally supported by the detent plate 20 and the bracket 24. The collar member 34 is rotatably supported by this pivotal shaft 26 coaxially therewith with both ends thereof in contact with the inner surfaces of the detent plate 20 and the bracket 24. The U-shaped bracket 28 is linked to the pivotal shaft 26 and the collar member 34 with a pin 32 passed through the cam grooves 40 formed in the collar member 34 and the straight slots 30 formed in the pivotal shaft 26.

Therefore, when the shift lever 14 is moved in the vehicle longitudinal (Y) direction, the collar member 34 is directly pivoted clockwise or counterclockwise about the pivotal shaft 26, so that the output lever 38 fixed to the collar member 34 is pivoted in the same way to move the select rod 50. On the other hand, when the shift lever 14 is moved in the vehicle lateral (X) direction, since the pin 32 is moved along the straight slot 30 and the cam grooves 40, the collar member 34 is also pivoted in either direction to pivot the output lever 38.

As depicted in FIG. 2, at the position where the shift lever 14 is vertically set, the pin 32 is located to the rightward end of the straight slots 30 and the cam grooves 40. In more detail, with reference to FIG. 5, each cam groove 40 includes a rightward end portion 40a (P, R, N, D, 3, 2) extending in the axial direction of the collar member 34, an inclined portion 40b, and a leftward end portion 40c (1) also extending in the axial direction thereof.

Therefore, where the shift lever 14 is vertically set, since the pin 32 is located at the rightward end 40a of the straight slots 30 and the cam grooves 40, whenever the shift lever 14 is moved in the vehicle longitudinal (Y) direction from P to 2 range positions, the collar member 34 is pivoted by the pin 32 located at the rightward end portion 40a to pivot the output lever 38. This pivotal motion is called pivotal motion transmitting operation.

On the other hand, the upper end portion 20a of the detent plate 20 is bent horizontally in parallel to the base plate as shown in FIG. 1. An elastic U-shaped bush member 46 is fixed on this top of the detent plate 20. Therefore, when the shift lever 14 is moved in the rearward direction, the shift lever 14 is slidably inserted into a space 44 of the U-shaped bush member 46. Under these conditions, when the shift lever 14 is inclined in the vehicle lateral (X) direction with the bush member 46 as its fulcrum as shown by dot-dot-dashed lines in FIG. 2, the pin 32 is moved in the opposite leftward direction in FIG. 5. When the pin 32 is slid along the straight slots 30 of the pivotal shaft 26, since the pin 32 is also moved along the inclined portion 40b of the cam groove 40 of the collar member 34, the collar 34 is pivoted as shown by dot-dot-dashed lines in FIG. 2 (in the downward direction in FIG. 2 and counterclockwise in FIG. 4) to pivot the output lever 38. This motion is called pivotal motion converting operation.

In summary, when the shift lever 14 is pivoted in the (Y) direction about the pivotal shaft 26, since the pin 32 directly pivots the collar member 34 about the pivotal shaft 26, the output lever 38 is pivoted. On the other hand, when the shift lever 14 is inclined in the (X) direction with the bush member 46 as its fulcrum, since the pin 32 pivots the collar member 34 by its sliding motion along the cam grooves 40, the output lever 38 is further pivoted.

On the other hand, the shift lever guide cover 22 is formed with a shift guide slot 52 for restricting the shift motion of the shift lever 14. In FIG. 1, P (parking), R (reverse) and N (neutral) range positions are arranged at a straight line in the Y direction, N (neutral) and D (drive) range positions are arranged in a crank shaped groove 52a; D (drive) and 3 (overdrive) range positions are arranged at a straight line; 3 (overdrive) and 2 (manual II) range positions are arranged in another crank shape 52b opposite to the crank shaped groove 52a; and 2 (manual II) and 1 (manual I) range positions are arranged at another straight line extending in the X direction. The stroke of the shift lever 14 at the crank shaped grooves 52a and 52b corresponds to the axial length of the rightward end portion 40a of the cam grooves 40 formed in the collar member 34.

Further, the shift lever 14 is provided with a detent pin 56 moved up and down when a button 54 disposed in a lever knob 16 is released or depressed. This detect pin 56 is engaged with or disengaged from a cam surface 58 formed in the detent plate 20 in order to restrict the shift motion of the shift lever 14 between P and R range positions and between N and R range positions.

The operation of the shift lever device as described above will be described.

To change the range positions of the automatic transmission, the shift lever 14 is shifted along the guide slot 52 formed in the guide cover 22. In this case, P, R, N, 3 and 2 range positions can be selected by moving the shift lever 14 in the vehicle longitudinal (Y) direction, while 2 and 1 range positions can be selected by moving the shift lever 14 in the vehicle lateral (X) direction. When the shift lever 14 is moved from P to 2 range positions, the collar member 34 is pivoted counterclockwise in FIGS. 1, 3 and 4 with the pin 32 located at the rightward end 40a (FIG. 5) of the cam grooves 40 of the collar member 34; when the shift lever 14 is inclined from 2 to 1 range positions, the collar member 34 is further pivoted counterclockwise with the pin 32 slid along the cam grooves 40 of the collar member 34. In either case, when the collar member 34 is pivoted, the output lever 38 is also pivoted in the same direction, so that the selector rod 50 is moved in the Y direction to control the control valve (not shown) for an automatic transmission.

In the above shift lever shifting operation, when the shift lever 14 is moved from P to 1 in both the Y and X directions, the selector rod 50 can be moved in the same Y direction. Therefore, it is possible to arrange 7 range positions within a space for 6 range positions.

Further, the crank shaped guide slot 52a serves to prevent the shift lever 14 from being directly moved from N to D range positions or vice versa, and the crank shaped guide slot 52b serves to prevent the shift lever 14 from being directly moved from 3 to 2 range positions or vice versa.

Figure 6:
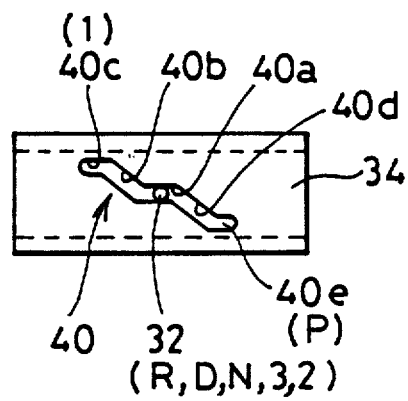
FIG. 6 is an illustration for assistance in explaining another modification of the cam groove formed in a collar of the shift lever device.
Figure 7:
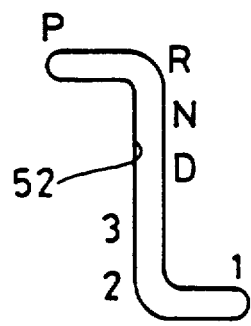
FIG. 7 is an illustration for assistance in explaining a shift lever guide of the modification shown in FIG. 6.

FIGS. 6 and 7 show another modification of the shift lever device shown in FIG. 1. In this modification, the cam grooves 40 formed in the collar member 34 are formed as shown in FIG. 6. That is, each cam groove 40 includes a central portion 40a (R, D, N, 3, 2) extending in the axial direction of the collar member 34, a first inclined portion 40b, a leftward end portion 40c (I) also extending in the axial direction, a second inclined portion 40d, and a rightward end portion 40e (P). Further, the shift lever guide slot 52 is formed as shown in FIG. 7.

In this modification, when the shift lever 14 is shifted to P range position, the collar 34 is pivoted oppositely clockwise, when shifted to 1 range position, the collar member 34 is further pivoted counterclockwise in FIG. 4.

That is, in this modification it is possible to arrange 7 range positions within a space for 5 range positions.

Figure 8:
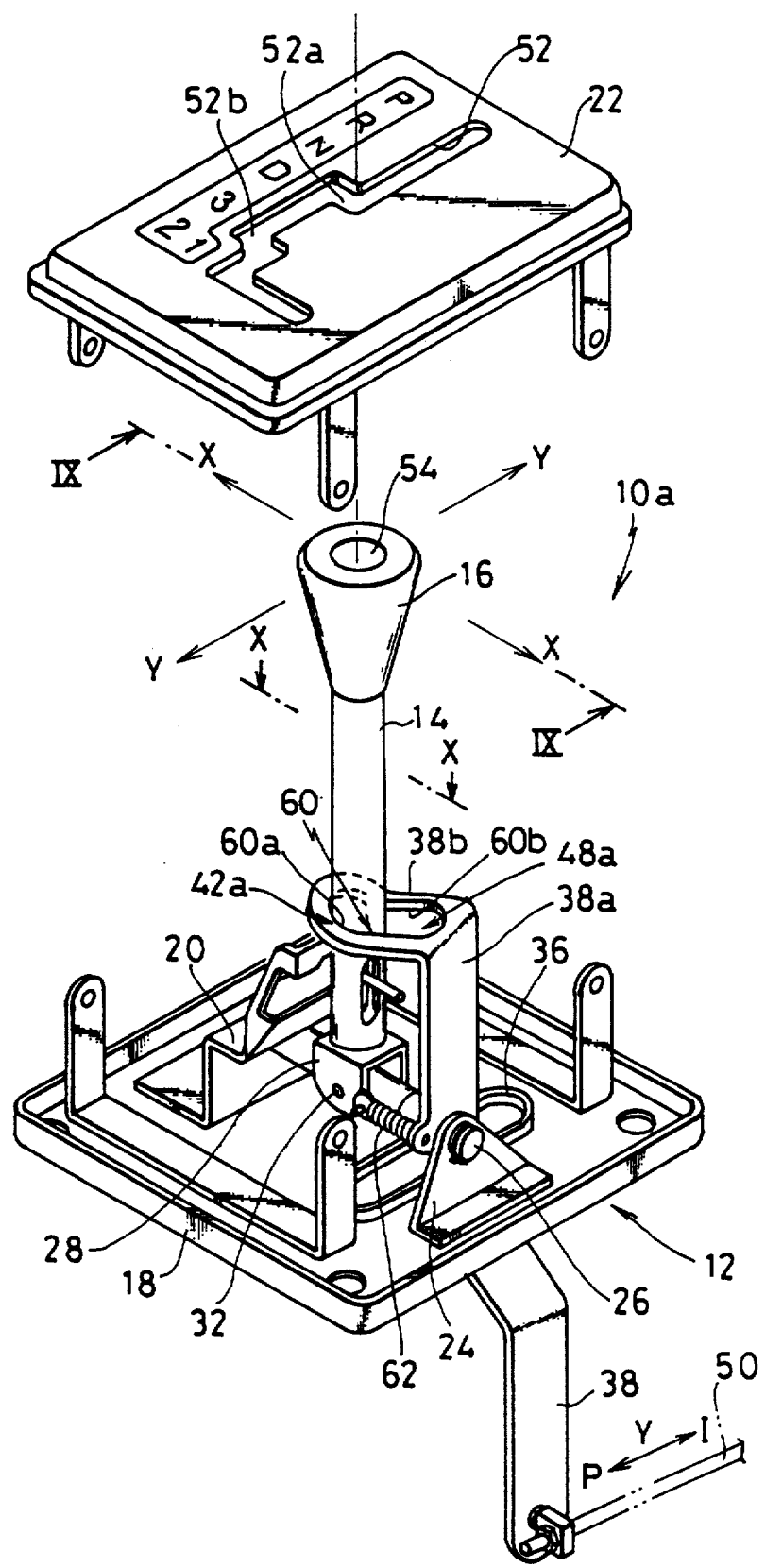
FIG. 8 is a perspective, partially exploded view showing a second embodiment of the shift lever device according to the present invention.
Figure 9:
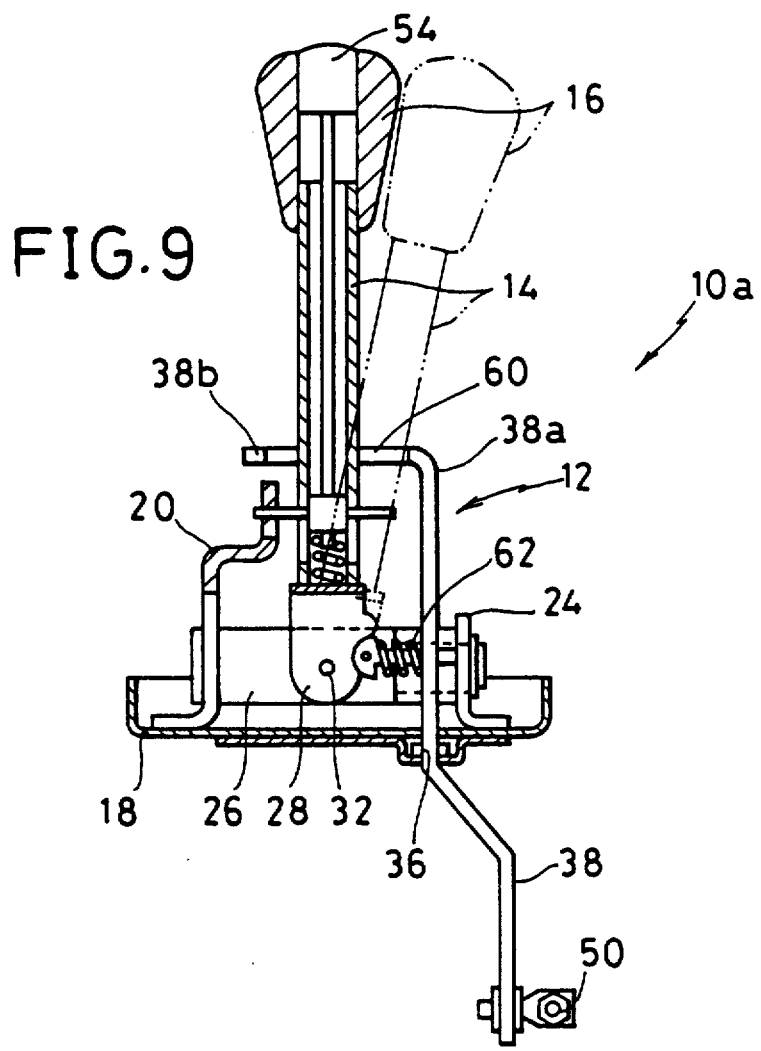
FIG. 9 is a cross-sectional view taken along the line IX—IX in FIG. 8.
Figure 10:
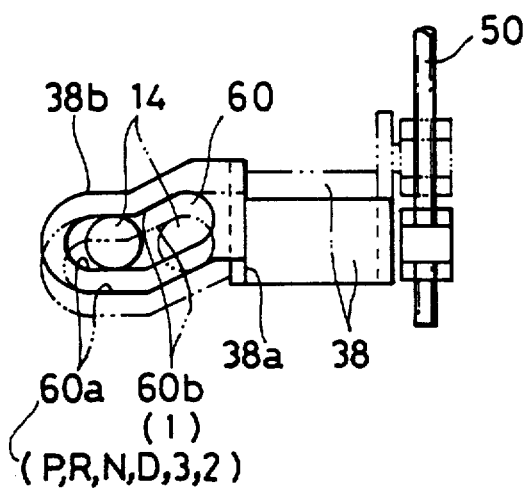
FIG. 10 is a top view when seen from above (X—X) in FIG. 8.
Figure 11:
FIG. 11 is an illustration for assistance in explaining a shift lever guide of the prior-art shift lever device for controlling an automatic transmission.

FIGS. 8 to 10 show a second embodiment of the shift lever device according to the present invention. In this embodiment, the output shaft 38 is formed with a cam groove 60 so as to be directly pivoted by the shift lever 14. The same references have been retained for similar parts which have the same functions as with the first embodiment previously described, without repeating any detailed description thereof.

In this embodiment, only the pivotal shaft 26 is pivotally supported by the detent plate 20 and the bracket 24. The shift lever bracket 28 is pivotally supported by the pin 32 passed through the diametral direction of the pivotal shaft 26. That is, the pin 32 is not movable along the axial direction of the pivotal shaft 26 as in the first embodiment. Therefore, the shift lever 14 can be pivoted in the vehicle longitudinal (Y) direction about the pivotal shaft 26 and in the vehicle lateral (X) direction about the pin 32. The output lever 38 is pivotally supported around the pivotal shaft 26 and extends in the upward direction. An upper end of the upper portion 38a of the output lever 38 is bent toward the shift lever 14 roughly horizontally in parallel to the base plate 18 and formed with a cam groove 60 through which the shift lever 14 is passed, as shown in FIG. 8.

As shown in FIG. 10, the cam groove 60 includes a leftward end portion 60a (P, R, N, D, 3, 2) extending in the X direction and an inclined portion 60b (I). Therefore, when the shift lever 14 is set vertically as shown by solid lines in FIG. 9, the shift lever 14 is located at this leftward end portion 60a and shiftable between P and 2 range positions, so that the output lever 38 is directly pivoted in the Y direction. On the other hand, when the shift lever 14 is inclined as shown by dot-dot-dashed lines in FIG. 9, the shift lever 14 is located at the inclined portion 60b in FIG. 10 and shifted from 2 to 1 range portion. In this case, since the shift lever 14 moves along the cam groove 60 of the output lever 38, the output lever is further pivoted counterclockwise in FIG. 8 to a position as shown by dot-dot-dashed lines in FIG. 10.

Further, in this second embodiment, a spring 62 is disposed between the shift lever bracket 28 and the output lever 38 in order to always urge the shift lever 14 to the leftward end portion 60a of the cam groove 60.

As described above, in the shift lever device for an automatic transmission according to the present invention, since the pivotal motion transmitting and converting mechanisms 42 and 48 (i.e. the pivotal shaft 26 and the collar member 34) formed with the straight slots 30 and the cam grooves 40 are provided between the shift lever 14 and the output lever 38, when the shift lever is first moved in the vehicle longitudinal (Y) direction and then in the vehicle lateral (X) direction, it is possible to continuously pivot the output lever in the same direction, so that it is possible to move the control level connected to a control valve for an automatic transmission in the same direction.

In the shift lever device of the present invention, since the shift lever range positions are arranged being divided in both the directions, it is possible to decrease the longitudinal length of the shift lever device and therefore increase the size of the console box, while providing a better lever shift operation without allowing the driver to bend his body forward when he shifts the shift lever over a long stroke.

What is claimed is:

1. A shift lever device for controlling an automatic transmission for an automatic vehicle, comprising:
   (a) a shift lever pivoted in a first direction and a second direction perpendicular to said first direction, for controlling the automatic transmission;
   (b) a guide plate formed with a shift lever guide slot extending in both first and second directions, for guiding said shift lever at a plurality of transmission range positions;
   (c) a pivotal motion transmitting mechanism linked with said shift lever, for directly transmitting only a first-direction pivotal motion of said shift lever to a first-direction pivotal motion of an output lever;
   (d) a pivotal motion converting mechanism linked with said shift lever, for converting only a second-direction pivotal motion of said shift lever into said first-direction pivotal motion of said output lever, wherein
   said output lever is linked between said pivotal motion transmitting and converting mechanisms and the automatic transmission, for transmitting the transmitted and converted first direction pivotal motion to the automatic transmission to control the transmission.

2. The shift lever device of claim 1, wherein the first direction is a longitudinal direction of the vehicle, along which Park (P), Reverse (R), Neutral (N), Auto Drive (D), Overdrive (3) and Manual II (2) range positions are arranged; and the second direction is a lateral direction of the vehicle, along which Manual I (1) range position is arranged.

3. The shift lever device of claim 1, wherein said pivotal motion transmitting mechanism includes:
   (a) a U-shaped bracket fixed to a lower end of said shift lever;
   (b) a pivotal shaft; and
   (c) a pin for pivotally connecting said U-shaped bracket to said pivotal shaft; and wherein said pivotal motion converting mechanism includes:
   (d) a cam groove formed in said output lever extending at an inclination angle with respect to an axial direction of said pivotal shaft, said output lever being fixed to said pivotal shaft, said shift lever being passed through said cam groove.

4. A shift lever device for controlling an automatic transmission for an automatic vehicle, comprising:
   (a) a shift lever pivoted in first and second directions, for controlling the automatic transmission;
   (b) a guide plate formed with a shift lever guide slot extending in both said first and second directions, for guiding said shift lever at a plurality of transmission range positions;
   (c) a pivotal motion transmitting mechanism linked with said shift lever, for directly transmitting a first-direction pivotal motion of said shift lever to a first-direction pivotal motion of an output lever, said transmitting mechanism including;
      (1) a U-shaped bracket fixed to a lower end of said shift lever;
      (2) a pivotal shaft; and
      (3) a pin for pivotally connecting said U-shaped bracket to said pivotal shaft, wherein
   said output lever is linked between said pivotal motion transmitting mechanism and the automatic transmission, for transmitting said firstdirection pivotal motion of said shift lever to the automatic transmission to control the transmission; and
   (d) a pivotal motion converting mechanism linked with said shift lever, for converting a seconddirection pivotal motion of said shift lever into said first-direction pivotal motion of said output lever, said converting mechanism including a cam groove formed in said output lever extending at an inclination angle with respect to an axial direction of said pivotal shaft, said output lever being fixed to said pivotal shaft, said shaft lever being passed through said cam groove.

5. A shaft lever device for controlling an automatic transmission for an automatic vehicle, comprising:
   (a) a shift lever pivoted in first and second directions, for controlling the automatic transmission;
   (b) a guide plate formed with a shift lever guide slot extending in both first and second directions, for guiding said shift lever at a plurality of transmission range positions;
   (c) a pivotal motion transmitting mechanism linked with said shift lever, for directly transmitting only a first-direction pivotal motion of said shift lever on a first-direction pivotal motion of an output lever; and
   (d) a pivotal motion converting mechanism linked with said shift lever, for converting only a second-direction pivotal motion of said shift lever directly into the first-direction pivotal motion of the output lever, wherein said output lever is linked between said pivotal motion transmitting and converting mechanisms and the automatic transmission, for transmitting the transmitted and converted first direction pivotal motion to the automatic transmission to control the transmission.

* * * * *